United States Patent [19]

Webb et al.

[11] 4,296,593

[45] Oct. 27, 1981

[54] UNIVERSAL CROP DIVIDER MECHANISM

[75] Inventors: Bryant F. Webb, Ephrata; Stanley J. Makofka, New Holland; Emmett G. Webster, New Holland; Edward A. Blakeslee, New Holland, all of Pa.

[73] Assignee: Sperry - New Holland, New Holland, Pa.

[21] Appl. No.: 157,624

[22] Filed: Jun. 9, 1980

[51] Int. Cl.³ .............................................. A01D 45/02
[52] U.S. Cl. .................................. 56/98; 56/DIG. 9; 56/228; 56/119
[58] Field of Search ...................... 56/17.3, 14.3, 14.4, 56/16.3, 15.2, 228, 119, 189, 192, 208, 212, 97, 98, 160, DIG. 9

[56] References Cited

U.S. PATENT DOCUMENTS

| | | | |
|---|---|---|---|
| 2,822,656 | 2/1958 | Rogers | 56/228 |
| 3,473,305 | 10/1969 | Cyr | 56/DIG. 1 |
| 3,599,411 | 8/1971 | Scarnato et al. | 56/228 |

FOREIGN PATENT DOCUMENTS 2058255  8/1971  Fed. Rep. of Germany ........ 56/228

*Primary Examiner*—Robert A. Hafer
*Attorney, Agent, or Firm*—C. Hercus Just

[57] ABSTRACT

Crop divider mechanism for attachment to a knockdown bar of an agricultural harvesting or conditioning machine and comprising a pair of similar interchangeable left-hand and right-hand rod members bent into substantially trapezoidal shape with parallel opposite long and short sides and intervening sides sloping from said long side to said short side, pairs of bracket members attachable respectively in spaced relation along opposite end portions of said knockdown bar and each pair pivotally receiving one of said intermediate sides of said rod members, similar positioning plates respectively fixed to one bracket of each pair thereof and having several spaced holes to receive selectively one end of a positioning pin selectively to support said rod members in upstanding inoperative position or forwardly extending operative position, and supplemental flat links connected to a second plate adjacent each positioning plate in positions to engage said knockdown bar in a manner to hold said rod members no lower than in said forwardly extending operative position thereof and thereby prevent the same from accidentally falling from upstanding inoperative position toward and lower than said forwardly extending operative positions, said spaced holes selectively receiving bolts to fix said flat links in operative position upon said second plate whether interchanged between the right-hand or left-hand positions of said rod members upon said knockdown bar.

15 Claims, 6 Drawing Figures

UNIVERSAL CROP DIVIDER MECHANISM

BACKGROUND OF THE INVENTION

When an agricultural harvesting or conditioning machine is moved through a field having crops which are to be harvested or conditioned, said machine is usually moved along one side of the field to cut and harvest an initial swath, and then continue around the field successively cutting farther and farther into the crop material, one swath at a time, the machine having a sickle bar of predetermined width according to the width of the swath to be cut, whereby the outer end of said sickle bar moves through the crop material. Particularly when the crop material is very heavy or matted together to any appreciable extent, it is preferable to provide some sort of dividing mechanism, especially on the outer end of the machine adjacent the outer end of the sickle bar to at least partially form a parting path or line through the crop material and thereby, facilitate an orderly cutting of each swath of the material. Frequently, it also is desirable to provide the end of the machine adjacent the inboard end of the sickle bar with a crop divider, particularly to guide one edge of the swath of material in an orderly manner into the header of the machine with which the sickle bar is associated and thereby insure not only the cutting of the material, but prevent any of the same from being caught or snarled in any part of the machine.

Agricultural machines of the type to which the present invention pertains also usually have mounted thereon adjacent the forward end, above the sickle bar, and vertically spaced therefrom, a knockdown bar, which is anywhere from two or three feet above the ground, and said bar serves to engage and bend the oncoming material in a manner to facilitate the same being engaged by the sickle bar and moved rearwardly therefrom into other consolidating or conditioning means to which the cut material is directed. Such knockdown bar provides a very convenient support means for crop dividing devices and the present invention utilizes such bar for purposes of supporting the improved crop divider members comprising the subject matter of the present invention.

Various types of crop dividers have been used on harvesting equipment heretofore to various degrees of success or difficulties. One typical example of crop divider which has been developed previously comprises the subject matter of U.S. Pat. No. 3,599,411 to Scarnato et al, dated Aug. 17, 1971, but the crop divider illustrated in said patent has only limited utility in contrast to the divider mechanism comprising the subject matter of the present invention, details of the latter being set forth hereinafter.

Furthermore, crop harvesting machines of the type having a reel which partially consolidates cut crop because the cutting width of the header is greater than the width of the conditioning unit, need a structure at both sides to keep tall crops from being "whip-lashed" around the sides of the header. Also, harvesters having large cutting widths have been provided with transport mechanisms so that the harvester is transported with the header substantially longitudinal to the direction of travel when in the transport position (e.g. the direction of travel during transport is at right angles to the direction of travel during the harvesting operation relative to the frame of the harvester). For such machines, prior art crop dividers would greatly increase the overall transport width.

SUMMARY OF THE INVENTION

It is an object of the present invention to overcome the aforementioned disadvantages of the prior art by providing a crop divider for both sides of a crop harvesting machine that can be pivotally positioned between a horizontal crop engaging position and a vertical inoperative position.

It is another object of the present invention to provide a pair of crop dividing elements which are shaped from rod material substantially into a trapezoidal shape, said elements being identical and interchangeable for mounting respectively along opposite ends of a knockdown bar on the forward end of an agricultural harvester or conditioning machine, thereby minimizing inventory and manufacturing facilities, said dividing elements being respectively positioned in left-hand or right-hand end portions of the knockdown bar and when so mounted, the sides of said elements farthest from each other comprising portions which are connected to each other at an obtuse angle to form blunt projections extending away from each other and respectively adapted to cammingly force crop material which is to be cut, to be moved away from material still standing in the field and move the latter away from the ends of the machine.

Still another object of the invention is to provide pairs of brackets respectively connected to opposite end portions of the knockdown bar of a harvester or conditioner to pivotally support said dividing elements respectively in upright, inoperative positions or substantially horizontal forwardly extending operative position and include securing means for said dividing elements respectively to hold the same positively in said upright inoperative position or forwardly extending operative position, said means to secure the elements in said positions comprising positioning plates having a plurality of holes therein respectively corresponding to said several positions of the dividing elements and the mechanism including a spring-pressed pin selectively received in one of said holes, either to hold the dividing elements upright or in forwardly extending operative positions.

A further object of the invention is to additionally provide a flat link associated with each bracket and connected to the pivoted portion of each of said dividing elements in a manner to have one end of said links about a lower portion of the knockdown bar when the dividing elements extend forwardly in the operative positions thereof, and thereby either supplement the holding means afforded by said spring-pressed pins and supporting plate or operate independently of said securing means in the event said dividing elements either, accidentally or with intent, fall from an upper position toward the horizontal forwardly projecting position, such as when the spring-pressed securing pin may be in its inoperative position.

Ancillary to the immediate foregoing object, it is a further object to provide said flat links with a pair of holes selectively to receive a bolt by which the links are secured in operative position with respect to the brackets and supporting means thereon, said plurality of holes enabling the flat links to be used when the dividing elements are mounted respectively in left-hand or right-hand positions adjacent opposite ends of the knockdown bar.

It is a still further object of this invention to provide a crop divider for a pull-type crop harvesting machine, which has a transport position disposed at substantially right angles to the normal crop harvesting position, that flips up into a vertical inoperative position to reduce the overall transport width of the harvester.

It is an even further object of this invention to provide a crop harvesting machine which is durable in construction, inexpensive of manufacture, facile in assemblage, and simple and effective in use.

Details of the foregoing objects and of the invention, as well as other objects thereof, are set forth in the following specification and illustrated in the accompanying drawings comprising a part thereof.

DETAILED DESCRIPTION OF THE PREFERRED EMBODIMENT

Figure 1:
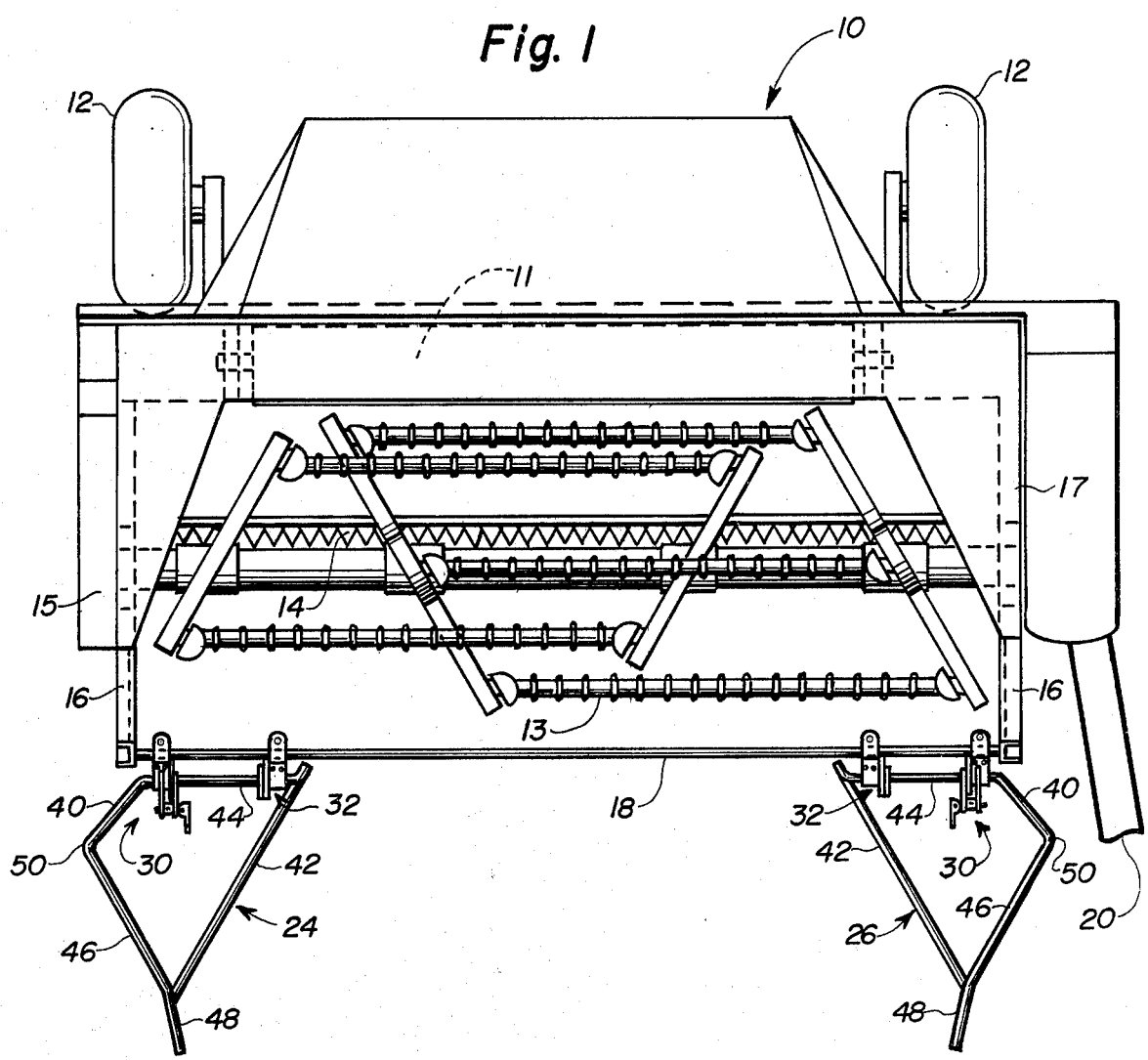
FIG. 1 is a top plan view of an exemplary agricultural implement having a knockdown bar on the forward part thereof and to which a pair of crop-divider units are connected respectively adjacent the opposite ends thereof.

Referring to FIG. 1, the exemplary crop harvesting or conditioning machine 10 is of the portable type and supported by a pair of wheels 12. The machine 10 also is of the type which supports a cutterbar 14 in the lower portion thereof and a pair of arms 16 extend forwardly from opposite sides 15, 17 thereof respectively to engage and support opposite ends of a horizontal knockdown bar 18, the inboard side 17 being closest to the drawbar 20 while the outboard side 15 is most distant therefrom. The machine is of the type that is drawn along a field of agricultural material to be harvested by means of a tractor and a drawbar 20, which is fragmentarily illustrated adjacent the right-hand side of FIG. 1, for purposes of connecting the same to a suitable tractor or the like. The present invention, however, is not restricted to being applied to a tractor-drawn machine but may be of a self-propelled type. The reel 13 is shown to be of the type that is operable to consolidate the severed crop for delivery to a conditioning means 11 which has a width less than the width of the cutterbar 14.

The present invention primarily comprises a pair of similar, interchangeable right-hand and left-hand divider members 24 and 26, said members being identical with each other, but by reversing the same 180° about the longitudinal axis thereof, they may be disposed either in left-hand or right-hand position as readily can be visualized from FIG. 1. In particular, the members 24 and 26 are formed from rigid rod material of appropriate diameter and strength, especially when it is to be considered that said divider members are used especially with crop material, which may be quite heavy and even somewhat matted, since the object of the dividers is to form a dividing line between material to be cut and that which is to remain standing in the field until subsequently cut. As can be visualized from FIG. 2, the knockdown bar 18 may be positioned above the ground level 28 as a matter of possibly two or three feet and the operative position of the members 24 and 26 in the forwardly extending manner, shown in FIG. 2, but capable of being raised to the vertical inoperative position, shown in phantom in FIG. 2, by means of the bracket structure by which the members are supported upon the knockdown bar 18.

Figure 5:
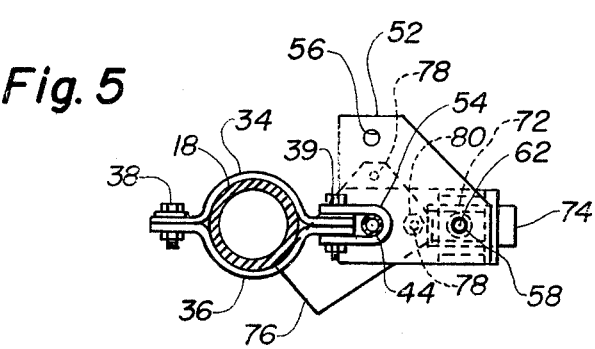
FIG. 5 is a side elevation of the bracket arrangement shown in FIG. 4, as seen on the line 5—5 thereof.

The bracket means 30 and 32 provided for each of the divider members 24 and 26 comprise a pair, which are the same for each of the divider members. Each pair, however, comprises a pair of strap members 34 and 36, having arcuate mid-portions which surround the knockdown bar 18, as best shown in FIG. 5, the opposite ends of the strap members 34 and 36 having ears projecting radially outwardly in abutting relationship and are secured together by appropriate bolts 38 and 39.

The bracket means 30 is different from the bracket means 32 in that it includes the positioning means by which the members 24 and 26 respectively are locked in the upright inoperative position or the forward operative positions, shown in FIG. 2, the locking means being described in detail hereinafter.

Figure 3:
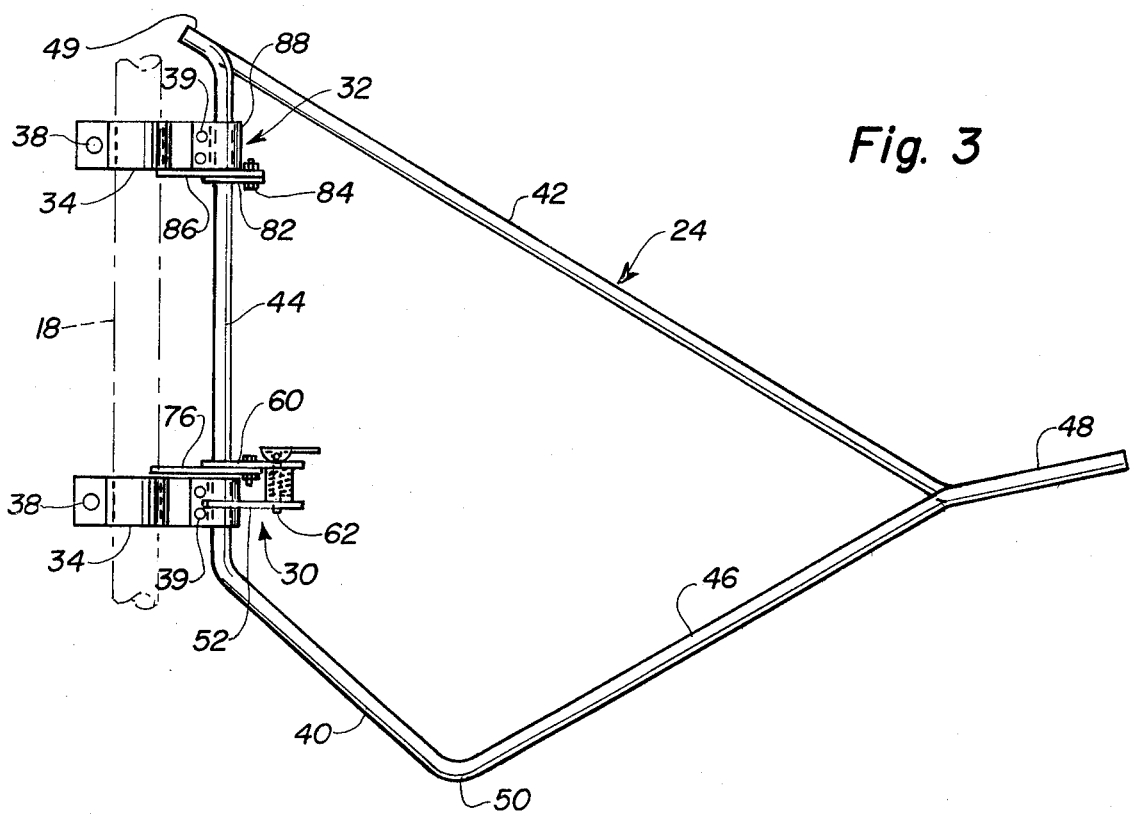
FIG. 3 is an enlarged top plan view of the right-hand crop-divider shown in FIG. 1, supported upon a fragmentary portion of the knockdown bar, illustrated in phantom.

Referring particularly to FIG. 3, wherein only the divider member 24 is shown, but having in mind that member 26 is identical, as illustrated, the same is trapezoidal in shape and has substantially parallel short and long sides 40 and 42, which are connected by angularly related intermediate sides 44 and 46. The intermediate side member 44 is pivotally supported by the bracket means 30 and 32, while the members 42 and 46 form a V-shaped forwardly extending point terminating in a short forwardly projecting members 48 for purposes of shunting the standing material which is not to be cut laterally outward along the intermediate side of 46.

It can be seen in FIG. 1 that the corresponding forwardly projecting members 48 on opposite members 24 and 26 tend to slightly extend toward each other. On pull-type machines, such as that exemplified in FIG. 1, the outboard side 15 tends to lag slightly behind the inboard side 17, this phenomenon being commonly referred as "crabbing". Therefore, when the harvester 10 "crabs", the forwardly projecting member 48 on the divider 24, adjacent the outboard side 15, becomes substantially parallel to the forward direction of travel. It will be seen from FIGS. 1 and 3 that the sides 40 and 46 of each of the divider members extend at an obtuse angle to each other, terminating in an apex 50, which extends outwardly either equal to or slightly beyond the adjacent side of the machine 10, and thereby cams the standing material away from said ends of the machine to prevent the same from becoming snarled or engaged therewith.

An advantage to placing the crop divider 26 at the inboard side 17 of the harvester 10 is to prevent crop material from becoming tangled in the sheet metal. The consolidating action of the reel 13 tends to "whip-lash" the tops of tall crops outwardly beyond the inboard side 17. The divider 26 provides a structure for guiding the tops of the crop material inwardly prior to engagement with the reel 13 to counteract the aforementioned "whip-lash" action. The trapezoidal shape of the crop dividers 24, 26 provides for a convenient structure for use as both a right-hand and a left-hand crop divider. An ear-like projection 49 extends rearwardly from the connection between the long side member 42 and the intermediate side member 44 toward the knockdown bar 18. This ear-like projection 49 prevents crop from sliding along the knockdown bar 18 and becoming tangled in the bracket 32.

The bracket 30 comprises a flat positioning plate 52, which has a hole through which the intermediate side member 44 of each of the divider members extends. Also, especially from FIG. 4, it will be seen that a U-shaped strap member 54 extends around the intermediate side 44 of the divider member and the opposite ends are secured to the ears of the strap members 34 and 36 by the bolts 39. Further, the plate 52 is fixed with respect to the strap member 54 by any suitable means, such as welding or the like and from FIG. 5, it will be seen that the plate 52 is rectangular but the upper right-hand corner has been removed, and said plate has a pair of holes 56 and 58 formed therein, said holes being equally spaced from the side member 44 of the divider member and axes extending from the latter to said holes respectively are at a right-angle to each other, the purpose of said holes appearing hereinafter.

Figure 2:
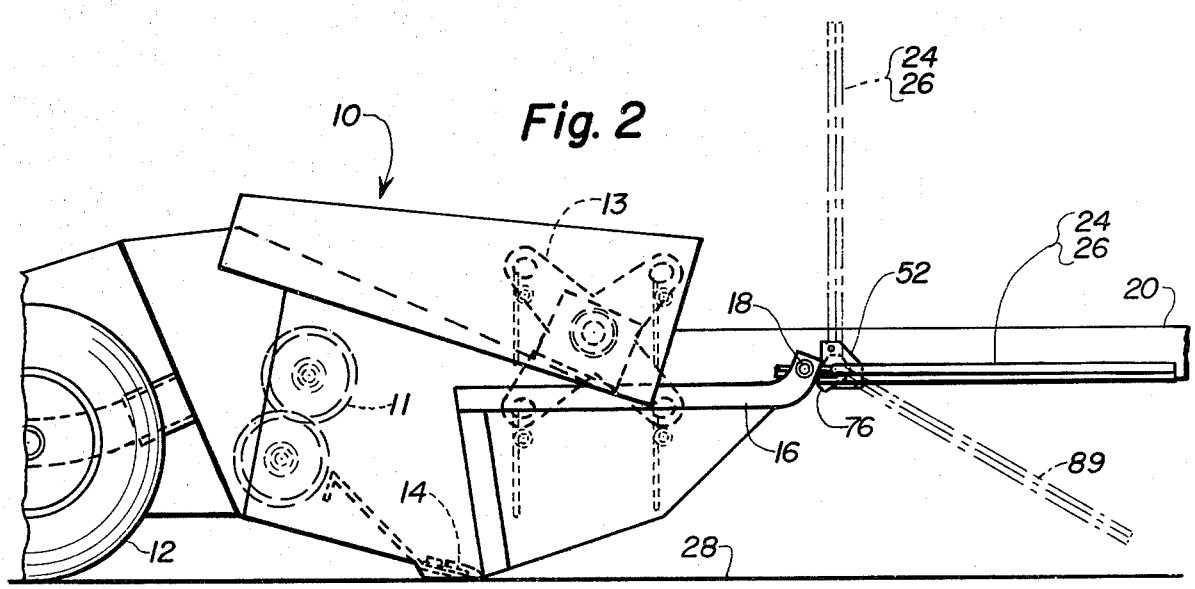
FIG. 2 is a fragmentary side elevation of the agricultural implement shown in FIG. 1, as seen from the right-hand end thereof and illustrating in full lines the crop-divider members extending forwardly in a horizontal operative position, while in phantom, they are shown both in an elevated vertical inoperative position and in a lowered operative position.
Figure 4:
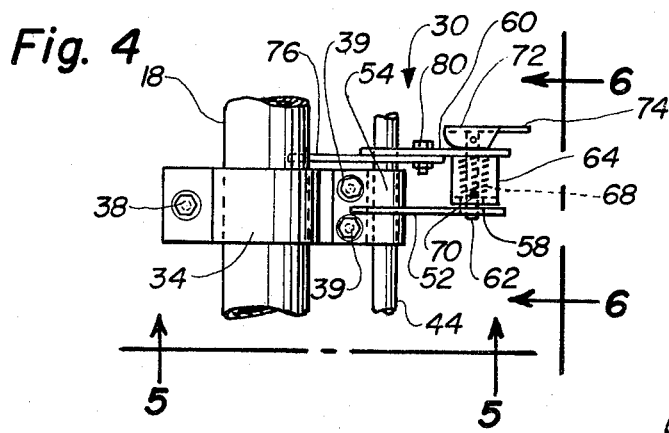
FIG. 4 is an enlarged fragmentary top plan view showing the lower bracket arrangement on the crop-divider member illustrated in FIG. 3.
Figure 6:
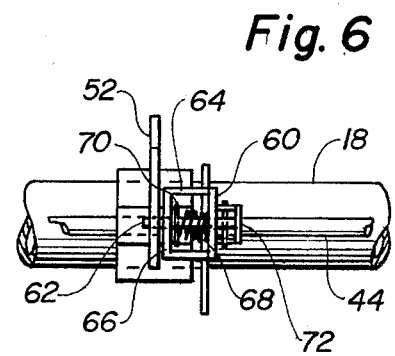
FIG. 6 is a fragmentary view of the end of the bracket arrangement shown in FIG. 4, as seen on the line 6—6 thereof.

The bracket 30 also comprises a second plate 60 which is flat and has a hole through which the side member 44 of the divider member extends and to which it is fixed by means of welding or the like, as indicated in FIG. 4, whereby the second plate 60 moves with the divider member when pivoted about the axis of the side member 44 between upstanding inoperative and forwardly projecting operative positions, respectively shown in FIG. 2. The divider member is held selectively in said positions by means of a positioning pin 62. A supplemental bracket 64, which is U-shaped in cross-section, as seen from FIG. 6, has the ends of the legs thereof fixed to the innerface of the second plate 60, as also shown in FIG. 6, and the right portion 66 of the bracket 64 has a hole therein through which the positioning pin 62 extends for purposes of being braced thereby. In FIG. 4, the pin 62 is shown in its operative position within the hole 58 of plate 52 and in which position it is maintained by the compression spring 68 which extends between the innerface of the second plate 60 and a transverse pin 70, which extends through the pin 62, as best shown in FIG. 6.

The end of the positioning pin 62, which is opposite that which extends through the hole in positioning plate 52, has a cam lever 72, pivotally connected thereto and has an operating ear 74 on the outer end thereof. When the cam lever 72 is moved from the horizontal position shown in FIG. 4 to vertical position at right-angles thereto, the pin 62 will be withdrawn from the hole 58. Under such circumstances, the divider member 24 may be elevated from the forwardly extending operative position, shown in full lines in FIG. 2, to the upright inoperative position, shown in said figure, and when the latter position, the pin 62 may be inserted in the second hole 56 in positioning plate 52 by means of lowering the cam lever 72 to the position shown in FIG. 4 with respect to the second plate 60.

In addition to the positioning means described hereinabove, a further flat link 76 which serves as an auxiliary or supplemental positioning member is best shown in FIG. 5, with one edge engaging the knockdown bar 18 in a manner to prevent further clockwise movement of the divider member below its desired forwardly extending full line operative position, shown in FIG. 2. The link 76 has therein a hole complementary to the side 44 of the divider member 24 and through which it extends. Opposite corners of the flat link 76 also are provided with a pair of holes 78 and in FIG. 5, it will be seen that the lowermost hole 78 has a bolt 80 extending therethrough to lock the link 76 against rotation with respect to second plate 60 against which the link flatly abuts, as clearly shown in FIG. 4. However, when the bracket means 30 just described with respect to the divider member 24, is mounted with respect to the divider member 26 adjacent the right-hand end of the machine 10, as seen in FIG. 1, it is necessary that the flat link 76 be changed from the position shown in FIG. 5 to a position in which the bolt 80 extends through the opposite hole 78 in order that the projecting end of the link 76 may suitably engage the knockdown bar 18 adjacent one lower surface portion of the bar in a manner similar to that shown in FIG. 5, and this is the reason for having a pair of holes 78 selectively engageable by the bolt 80.

Only one bracket means 30 is provided with each of the divider members since the same is adequate to maintain the divider member in operative or inoperative position, and especially when in the operative position, the link 76 augments the positioning function of the positioning pin 62. However, each divider member is provided with a bracket 32, which is substantially more simple than the bracket 30, as can be seen with reference to FIG. 3 in which a much more simple positioning plate 82 is shown, which is provided with a hole through which the pivoted side 44 of the divider member 24 extends and to which the plate 82 is fixed, such as by welding. Said plate also has only a single hole therein through which the bolt 84 extends but another flat link 86, which is preferably identical to the flat like 76, has a hole therein through which the side 44 of divider member 24 extends and the positioning plate 86 has a pair of holes therein identical with the holes 78 in flat plate 76, for purposes of permitting selective positioning of the flat link 86 in one of two positions in the same manner as described above with respect to flat link 76, and thereby, provide two auxiliary positioning members which engage a lower portion of the knockdown bar 18. Preferably, the bracket associated with the positioning plate 82 has another U-shaped strap member 88 secured thereto by bolts 39 and the flat link 86 is disposed between one end of the strap member 88 and the positioning plate 82.

Under some crop conditions, the operator may desire that the crop divider be directed downwardly in the position generally indicated in phantom in FIG. 2 by the numeral 89. This position can be easily attained by loosening the bolts 38 on the brackets 30 and 32 and rotating the entire crop divider assembly to the desired position. Furthermore, although the foregoing description is directed to a support structure which will lock the crop divider into two positions approximately 90° apart, other support structures could be utilized to provide a greater variety of selectable positions. Examples of such alternative support structures are a friction drag brake arrangement, providing a plurality of holes similar to holes 56, 58 and a bicycle kickstand type of arrangement.

From the foregoing, it will be seen that relatively simple, interchangeable bracket means are provided in sets which are similar for each of the divider members 24 and 26, which, in turn, are reversible for disposing the same either in left-hand or right-hand positions, as viewed in FIG. 1, and such interchange of position may be accomplished quickly and simply by interchanging certain holes and bolts. The spring-pressed positioning pin 62 particularly is the sole means for maintaining the divider members in the vertical inoperative position, but said pin is augmented by the flat links 76 and 86, which engage the knockdown bar 18 when the divider members are in the lower, forwardly extending horizontal positions. Also, the flat links 76 and 86 are adapted and arranged to prevent lowering of the divider members farther than the horizontal forwardly extending position thereof, such as in the event the positioning pins 62 are withdrawn from the receiving holes therefor in the positioning plates 52 and the divider members are accidentally released for falling movement, thereby providing safety means.

While the above description of a vertically moveable crop divider describes what is thought to be the best mode of the invention, one skilled in the art would readily realize that pivoting the crop divider in a substantially horizontal plane about a generally vertically inclined axis would allow the crop divider to be pivoted out of the way to minimize the effective transport width of the harvesting machine. A further embodiment would utilize both horizontal and vertical pivotal axes such that the crop divider would be moveable in both vertical and horizontal planes.

The foregoing description illustrates preferred embodiments of the invention. However, concepts employed may, based upon such description, be employed in other embodiments without departing from the scope of the invention. Accordingly, the following claims are intended to protect the invention broadly, as well as in the specific forms shown herein.

Having thus described the invention, what is claimed is:

1. Crop divider mechanism for use with an agricultural harvesting and conditioning machine having on the forward end thereof a transverse crop knockdown bar spaced above a cutting head thereon, said divider comprising a pair of similar interchangeable left-hand and right-hand rod members bent substantially into trapezoidal shape with two relatively long and short sides parallel to each other and two intermediate sides sloping toward each other from the said long side toward the short side to provide dividing elements, pairs of bracket members respectively adapted to be attached to said knockdown bar adjacent opposite ends thereof and having bearings therein respectively pivotally receiving one of said intermediate sides of said dividing elements with the long sides of said elements facing each other in spaced relationship along said knockdown bar, similar positioning plates respectively fixed to one of said brackets of each pair and having a first hole through which said one of said intermediate sides of said elements extends and two additional positioning holes spaced even distances from said first hole substantially along axes at ninety degrees to each other relative to said first hole, a second plate fixed to said one of said intermediate sides of said dividing elements adjacent said one of said brackets, and a positioning pin supported movably by said second plate perpendicularly thereto and spaced from said side of said dividing element a distance equal to the spacing of said two additional holes from said side of said element and said positioning pin being selectively positionable within one of said two additional positioning holes and thereby support said dividing elements selectively in horizontal operative or vertically upward inoperative positions relative to said knockdown bar.

2. The mechanism according to claim 1 in which said second plate has a hole through which said positioning pin is slidable, a spring engaging said pin and normally urging one end of it toward said positioning plate for reception in one of said two positioning holes therein, and retracting means engaging said pin and operable to move said one end of said pin away from said positioning plate and the holes therein.

3. The mechanism according to claim 2 in which said retracting means comprises a cam pivotally attached to the opposite end of said pin from said one end thereof and engageable with said second plate when moved in one direction to retract said pin from one of said holes into which it has been extended.

4. The mechanism according to claim 3 in which said second plate has a supplemental bracket fixed thereto and extending toward said positioning plate and provided with a guide hole coaxial with said hole in said second plate through which said pin extends, and said spring being a compression spring surrounding the intermediate portion of said positioning pin in the region between said second plate and guide hole in said supplemental bracket, and a transverse pin extending through said positioning pin in a position to be engaged by one end of said spring to urge said positioning pin into one of said two holes in said positioning plate.

5. The mechanism according to claim 1 in which said one of said brackets of each pair is slotted transversely to the axis of the bearing therein and the end of said positioning plate which has said first hole therein being disposed in said slot and fixed to said bracket.

6. The mechanism according to claim 1 in which said similar dividing elements are interchangeable, whereby only one shape thereof is required but the elements of said pair respectively being mounted in left-hand and right-hand positions upon said knockdown bar and in which positions the forward portions of said elements are V-shaped but the innermost sides of said elements have portions connected at an obtuse angle to form blunt projections extending toward each other and respectively adapted to cammingly force crop material to be moved away from material to be left standing in a field being harvested, said dividing elements additionally having interchangeable safety means to restrict said members moving below an exemplary forwardly extending substantially horizontal position, said safety means each comprising a flat link having a first hole through which said one of said intermediate sides of said driving element extends, said link being adjacent one side of said second plate and having one end provided with a pair of holes spaced equally from said first hole and a second end extending away from said one end and engageable with a lower side of said knockdown bar when said rod member is in horizontal operative position and thereby prevent further downward movement, and a bolt extending through one of said pair of holes and a complementary hole in said second plate to secure said link in said position to engage said knockdown bar, the other hole of said pair of holes in said link being adapted for use with the other dividing element to receive said bolt and secure said other rod member in horizontal position, said links functioning to arrest downward pivotal movement of said rod members from an upstanding position either accidental or intentional.

7. The mechanism according to claim 6 in which the other bracket of each pair is provided with a modified second plate having one end provided with a hole through which said intermediate side of said rod member extends, said plate being fixed at said one end to the pivoted portion of said dividing element and the other end extending radially therefrom, and a second flat link similar to the one set forth in claim 6 mounted flatly adjacent one side of said modified second plate and engaging a lower portion of said knockdown bar, and a bolt extending through aligned holes in similar ends of said modified second plate and second flat link to secure said second flat link in operative position against said knockdown bar when said dividing element is in extended horizontal position and thereby prevent further lowering movement of said dividing element.

8. In a pull-type crop harvesting machine having a frame; a tongue means connected to said frame and extending forwardly therefrom for connection to a prime mover; a crop harvesting header suspended forwardly from said frame to harvest standing crop material, said crop harvesting header having a forward end substantially transverse to the direction of travel of said crop harvesting machine, a crop cutting means mounted on said forward end for severing standing crop material, and spaced apart inboard and outboard ends substantially perpendicular to said forward end, said crop harvesting machine being positionable between a crop harvesting position wherein said crop harvesting header is disposed substantially transverse to the direction of travel and offset to the side of said prime mover with said outboard end being laterally most distant from said prime mover to sever standing crop material and a transport position; and a crop divider mounted to said forward end of said crop harvesting header adjacent said outboard end, an improved crop divider comprising:
   a preformed member projecting forwardly of said forward end of said crop harvesting header when said crop divider is in an operative crop engaging position;
   mounting means pivotally connecting said preformed member to said forward end of said crop harvesting header about a substantially horizontal axis transverse to the forward direction of travel, said mounting means including a stop link engageable with said forward end of said crop harvesting header when said crop divider is in a predetermined position relative to said crop harvesting header to limit further pivotal movement of said body portion below said predetermined position; and
   locking means for securing said preformed member in either a generally horizontal inclined crop-engaging position or a substantially vertically inclined inoperative position, said locking means including a positioning plate affixed to said mounting means and having a first hole therein for receiving a portion of said preformed member, said positioning plate further having two positioning holes substantially equidistantly-spaced from said first hole, said locking means further including a second plate fixed to said preformed member adjacent said mounting means and a positioning pin movably supported by said second plate and spaced from said preformed member to be registrable with said positioning holes, said positioning pin being selectively positionable within said positioning holes, respectively, to positively and selectively lock said preformed member into a substantially horizontal operative position and a substantially vertical inoperative position.

9. The crop harvesting machine of claim 8 wherein said crop harvesting header is disposed substantially longitudinally to the direction of travel when said crop harvesting machine is in said transport position, said transport position of said crop harvesting machine being at substantially right angles to said crop harvesting position, such that, when said crop harvesting machine is placed into said transport position, said crop divider may be moved into said vertical inoperative position to reduce the overall transport width of said crop harvesting machine.

10. The crop harvesting machine of claim 8 or 9 wherein said forward end of said crop harvesting header includes a crop knockdown bar mounted above said crop cutting means, said mounting means pivotally connecting said preformed member to said knockdown bar, said preformed member generally trapezoidal in shape and having a long member, a short member substantially parallel to said long member, and first and second intermediate members interconnecting said long and short members, said first intermediate member being disposed substantially parallel to said knockdown bar, said long member and said second intermediate member being joined together at an acute angle and forming a V-shaped point projecting forwardly from said crop harvesting header, said crop divider being operable to pass crop material to be cut along said long side and to pass crop material to remain uncut along said second intermediate member.

11. The crop harvesting machine of claim 10 wherein said V-shaped point formed by said long member and said second intermediate member terminates in a short forwardly projecting member, said forwardly projecting member being inclined slightly toward the center of said crop harvesting header such that any displacement of said outboard end of said crop harvesting machine rearwardly of said inboard end will result in said forwardly projecting member being disposed substantially parallel to the direction of travel of said crop harvesting machine during said crop harvesting position.

12. The crop harvesting machine of claim 11 wherein an additional crop divider is mounted on said knockdown bar adjacent said inboard end of said crop harvesting header, said crop dividers being disposed such that said corresponding long members face each other in spaced relationship along said knockdown bar.

13. The crop harvesting machine of claim 11 wherein said preformed member further includes an ear member extending rearwardly beyond the connection between the first intermediate member and said long member toward said knockdown bar, whereby crop material is prevented from sliding along said knockdown bar and engaging said mounting means.

14. The crop harvesting machine of claim 8 wherein said second plate has an opening therethrough for slidably receiving said positioning pin, said locking means further including a spring means engaging said positioning pin and normally urging said pin toward said positioning plate for reception in one of said two positioning holes therein, and retracting means engaging said pin and operable to move said positioning pin outwardly from said positioning plate and the holes therein.

15. The crop harvesting machine of claim 14 wherein said retracting means includes a cam pivotally attached to the end of said positioning pin adjacent said second plate and engageable with said second plate to retract said positioning pin from one of said positioning holes into which it has been extended.

* * * * *